United States Patent [19]

Darden et al.

[11] Patent Number: 5,467,130
[45] Date of Patent: Nov. 14, 1995

[54] GROUND DRIVEN DELAY LINE CORRELATOR

[75] Inventors: Kim M. Darden, Vista; Hokon O. Flogstad, La Mesa, both of Calif.

[73] Assignee: Eastman Kodak Company, Rochester, N.Y.

[21] Appl. No.: 330,757

[22] Filed: Oct. 28, 1994

[51] Int. Cl.$^6$ .................................................. H04N 3/14
[52] U.S. Cl. ........................................ 348/241; 348/250
[58] Field of Search ...................... 348/241, 250, 348/294, 322; 327/91, 93, 94, 96; H04N 3/14

[56] References Cited

U.S. PATENT DOCUMENTS

| | | | |
|---|---|---|---|
| 4,283,742 | 8/1981 | Izumita et al. | 348/241 |
| 4,287,441 | 9/1981 | Smith | 307/353 |
| 4,845,382 | 7/1989 | Eouzan et al. | 307/353 |
| 4,987,321 | 1/1991 | Toohey | 327/96 |
| 5,086,344 | 2/1992 | D'Luna et al. | 348/250 |
| 5,398,060 | 3/1995 | Leacock et al. | 348/241 |

*Primary Examiner*—Wendy R. Greening
*Attorney, Agent, or Firm*—William F. Noval

[57] ABSTRACT

A ground driven delay line correlator circuit for removing noise from an image signal produced by a solid state imaging device such as a CCD sensor. The delay line is made up of a shielded inductor having a certain impedance and delay period.

8 Claims, 4 Drawing Sheets

$E_{out}^{(t)} = E_{in}^{(t)} - E_{in}^{(t-y)}$

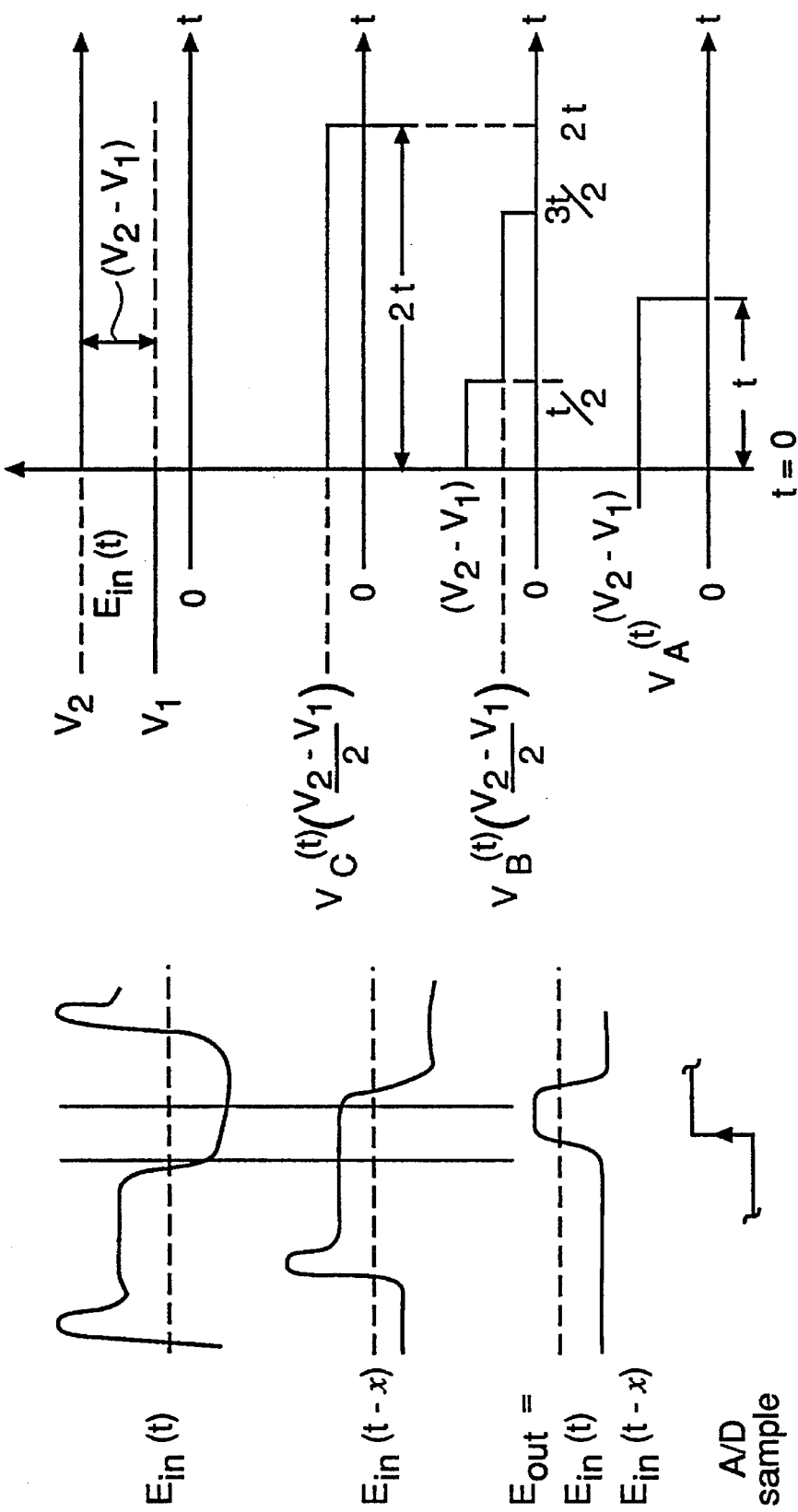

GROUND DRIVEN DELAY LINE CORRELATOR

FIELD OF INVENTION

This invention relates in general to signal processing circuits and more particularly to a ground driven delay line correlator circuit for eliminating noise in signals which need to be correlated.

BACKGROUND OF THE INVENTION

A Signal processing technique known as correlated double sampling is commonly used to eliminate noise in a signal which needs to be correlated. An example of such a signal is the image signal from a solid state imaging device (such as a charge-coupled device (CCD) image sensor) in order to obtain low noise performance. Correlated double sampling is equivalent to subtracting a reset reference level ($V_{reset}$) from an image level ($V_{image}$) for each output pixel from the CCD image sensor.

A CCD output circuit, shown in FIG. 1, converts the photoelectrically generated signal charge to a voltage signal. Charge packets from the CCD imager photosites (not shown) are transferred into a horizontal shift register 10. The charge packets are shifted horizontally via horizontal clocks H1 and H2 and onto a floating diffusion node 12 via output gate 13. The potential of the floating diffusion node 12 changes linearly in proportion to the number of electrons in the charge packet. The potential of the floating diffusion node 12 is applied to the input gate of a two stage source follower circuit 14, producing a signal at $V_{out}$. A reset transistor 16 driven by the reset clock RESET recharges the floating diffusion node 12 to the positive potential $V_{rd}$ before the arrival of each new charge packet from the horizontal shift register 10.

FIG. 2(A) shows the signal waveform $V_{out}$ at the output of the source follower 14 of FIG. 1. The waveform contains three components: the reset clock feedthrough ($V_{ft}$), the reset reference level ($V_{reset}$), and the image level ($V_{image}$). The feed through $V_{ft}$ occurs as a result of capacitive coupling between the RESET gate 16 and the floating diffusion node 12. When the floating diffusion 12 is reset, the exact reset voltage is affected by "thermal" noise, whose level depends on the capacitance of the floating diffusion node 12 and the temperature. The same random reset noise voltage affects the level of both the reference level $V_{reset}$ and the image level $V_{image}$. By taking the difference between samples of $V_{reset}$ and $V_{image}$ for each pixel, this "thermal" noise can be eliminated. This also reduces low frequency noise from the two stage source follower output amplifier 14.

A commonly known circuit for performing correlated double sampling is shown in FIG. 3 (see, for example, the circuits disclosed in U.S. Pat. Nos. 4,283,742 and 4,845,382). The signal $V_{out}$ from the circuit of FIG. 1 forms the input signal $V_{in}$ to sample/hold circuits 20 and 22, and the output of the sample/hold circuit 20 is further sampled by a sample/hold circuit 24. The aforementioned difference signal $V_D$ is taken between the outputs of the sample/hold circuits 22 and 24 by a subtracting circuit 26. FIGS. 2(B) and 2(C) show the sampling waveforms S/H(1) and S/H(2) that respectively drive the sample/hold circuit 20, and the sample/hold circuits 22 and 24. Sampling pulses from the waveform S/H(1) cause the sample/hold circuit 20 to sample the resent reference level ($V_{reset}$). Sampling pulses from the waveform S/H(2) cause the sample/hold circuit 22 to sample the image level ($V_{image}$), while simultaneously causing the sample/hold 24 to sample the output of the sample/hold circuit 20, thus effecting a delay in the reset reference level ($V_{reset}$). A noise-free image signal $V_D$ (shown in FIG. 2(D)) is then obtained from the differencing circuit 26 by taking the difference between the outputs of the sample/hold circuits 22 and 24.

Another correlating circuit shown in FIG. 4 utilizes a delay line and sample-and-hold circuits U.S. Pat. No. 4,287,441, issued Sep. 1, 1981, inventor Smith. As shown in FIG. 4, a low gain high current buffer/driver 81 is capacitively coupled to the output of the CCD. The output of this amplifier is fed to two nearly identical channels. The input of one channel has a delay line 82, while the input of the second channel has only an attenuator 83. Each channel has a sample-and-hold circuit 84 and 85, operating from the same source of clock pulses 86. The output of each channel is fed to one input of a differential amplifier 87. In some cases a midstage sample-and-hold 88 may be included at the output of the differential amplifier. Sample and hold circuit 88 is operated in synchronism with circuits 84 and 85. A high gain amplifier 89 can also be coupled to the output of the midstage S&H. The total circuit gain G is divided between these two amplifier elements.

The input S/H 84 with delay 82 is strobed to acquire the reference level signal; the input S/H 85 without delay, simultaneously strobed, acquires the video level signal within the same basic period.

U.S. Pat. No. 5,086,344, issued Feb. 4, 1992, inventors D'Luna et al., discloses a digital correlated double sampling circuit for sampling the output of an image sensor. The digital correlated double sampling circuit employs three resisters and a single clock signal to sample the output of a charge transfer device. The first register samples the reset reference value on the falling edge of the master clock cycle while the remaining two registers sample on the rising edge. The second register samples the image level and the third register samples the output of the first register, thus effecting a delay of the reset reference level. The outputs of the second and third registers, that is, the image level and the reset reference level, are differenced to provide a noise-free image signal.

A problem exists in the correlator signal processing circuits disclosed in these patents. Since these circuits use active circuit elements (e.g., sample and hold circuits) which rely on additional timing and control circuitry for operation, the prior art correlator circuits are complex and expensive.

SUMMARY OF THE INVENTION

According to the present invention, there is provided a ground driven delay line correlator circuit which solves the problems of known correlator circuits. The correlator circuit of the present invention has the following advantages.

1. Simple.
2. More accurate.
3. Inexpensive.
4. Completely passive.
5. Better at high frequencies because delay line is shorter.
6. Analog-to-digital converter can be used directly without sample-and-hold circuits and associated timing and control circuitry.
7. Low pass filtering can be effected either before or after the correlator circuit.

According to an aspect of the present invention, there is provided a correlator circuit for removing noise from a signal, such as an image signal, comprising a shielded delay line having a characteristic impedance $Z_O$ and a delay period $\tau$; said shielded delay line having an inductor with first and second terminals and a shield terminal which is connected to electrical ground; an impedance connected between said second terminal and electrical ground, said impedance having an impedance value $Z_O$; and a signal source (an image signal) for providing to said shield terminal of said shielded delay line a signal (an image signal) having a sequence of a first interval with a first (reset) signal value and a second interval with a second (an image) signal value;

wherein the (image) signal output from said first terminal of said delay line is free from noise and has a signal value which is a function of the difference between said first (reset) signal value and said second (image) signal value.

BRIEF DESCRIPTION OF THE DRAWINGS

FIGS. 7 and 8 show waveform diagrams useful in explaining the operation of the correlator circuit of FIG. 6.

DESCRIPTION OF THE PREFERRED EMBODIMENTS

Although a preferred embodiment of the present invention will be described below with specific reference to image signal processing, it will be understood that the correlator circuit of the present invention is applicable to any signal which needs to be correlated.

Figure 1:
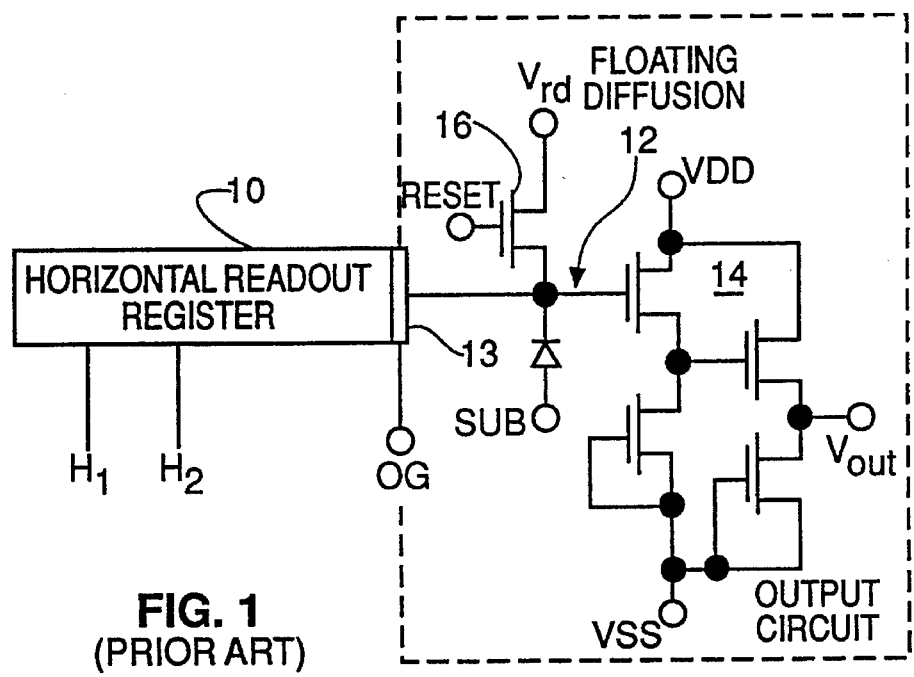
FIG. 1 is a schematic diagram showing a known output circuit for a solid state imaging device.
Figure 2:
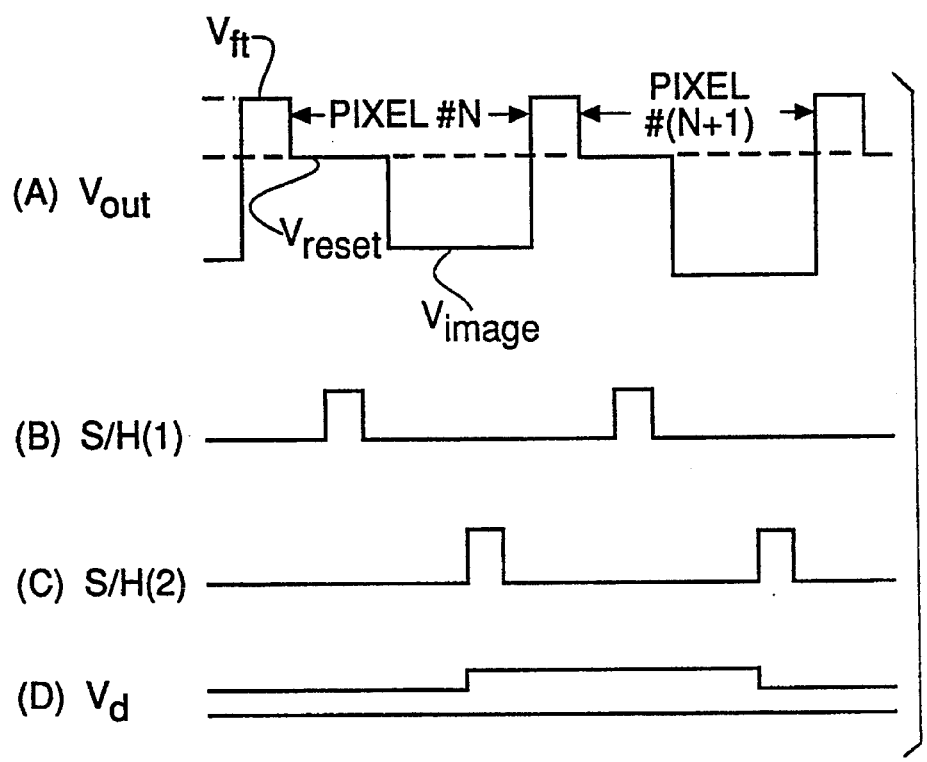
FIG. 2 shows the signal waveform (FIG. 2(A)) developed by the known circuit of FIG. 1 and illustrates (FIGS. 2(B), 2(C)) the points at which the waveform may be double sampled to obtain an image signal difference waveform (FIG. 2(D)).
Figure 3:
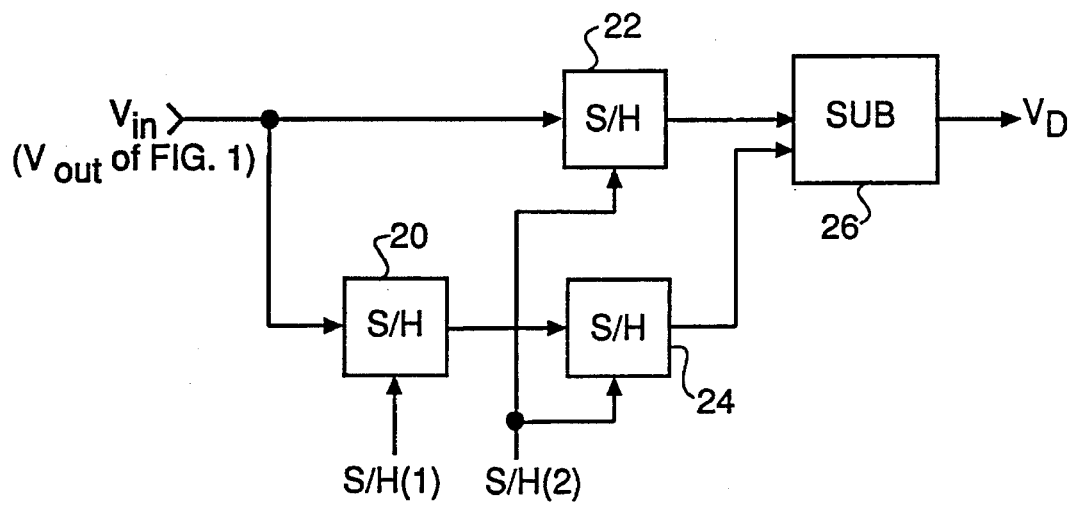
FIG. 3 is a block diagram of a known circuit for performing correlated double sampling of the waveform of FIG. 2(A) according to the sample waveforms of FIGS. 2(B) and 2(C).
Figure 4:
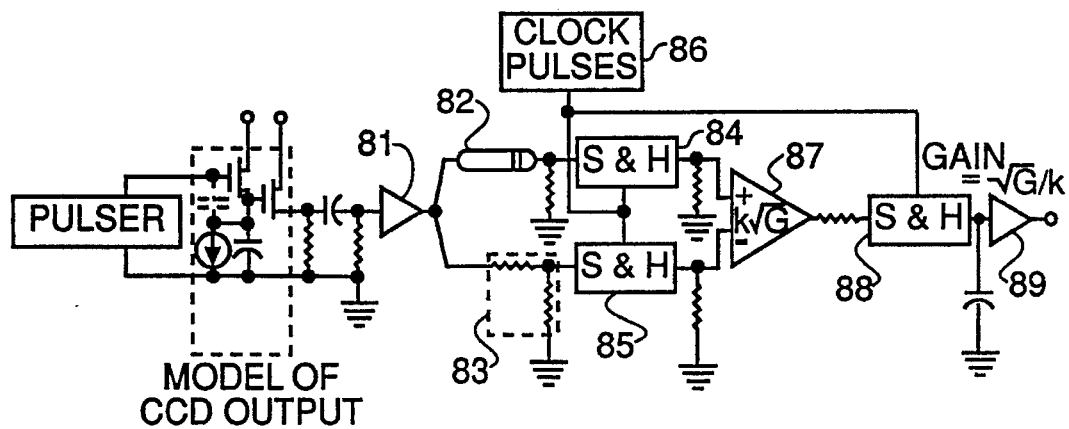
FIG. 4 is a block diagram of another known circuit for performing correlated double sampling of a video signal produced by a CCD sensor.
Figure 5:
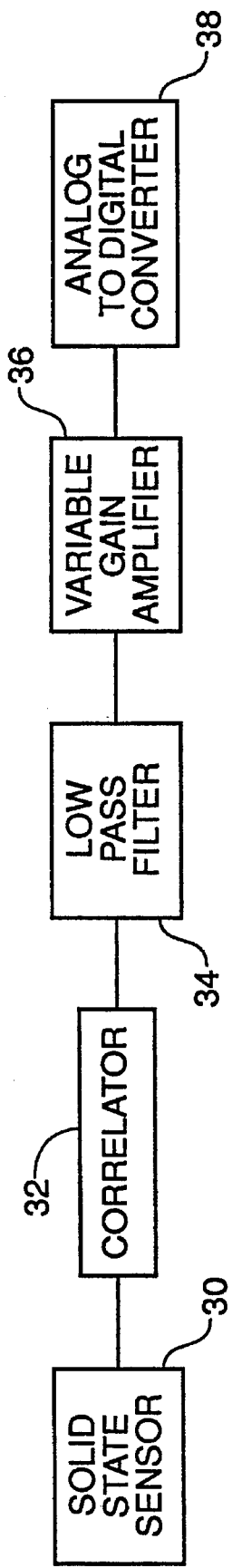
FIG. 5 is a block diagram of a video signal processing circuit incorporating the present invention.

Referring now to FIG. 5, there is shown an image signal processing circuit incorporating a correlator circuit according to the present invention. As shown, a solid state image sensor 30 (such as a CCD or MOS sensor) produces an image signal such as shown in FIG. 2(A). The image signal has a pixel sequence of a first interval with a reset signal value (reset voltage) and a second interval with an image signal value (image voltage). Noise which is present in both of the pixel intervals is eliminated by passive correlator circuit 32. The output of correlator circuit 32 is a signal representing the pixel image information without low frequency noise. Low pass filter 34 eliminates high frequency noise from the image signal. Variable gain amplifier 36 amplifies the analog image signal before it is sampled and converted to a digital signal by analog-to-digital converter 38.

Figure 6:
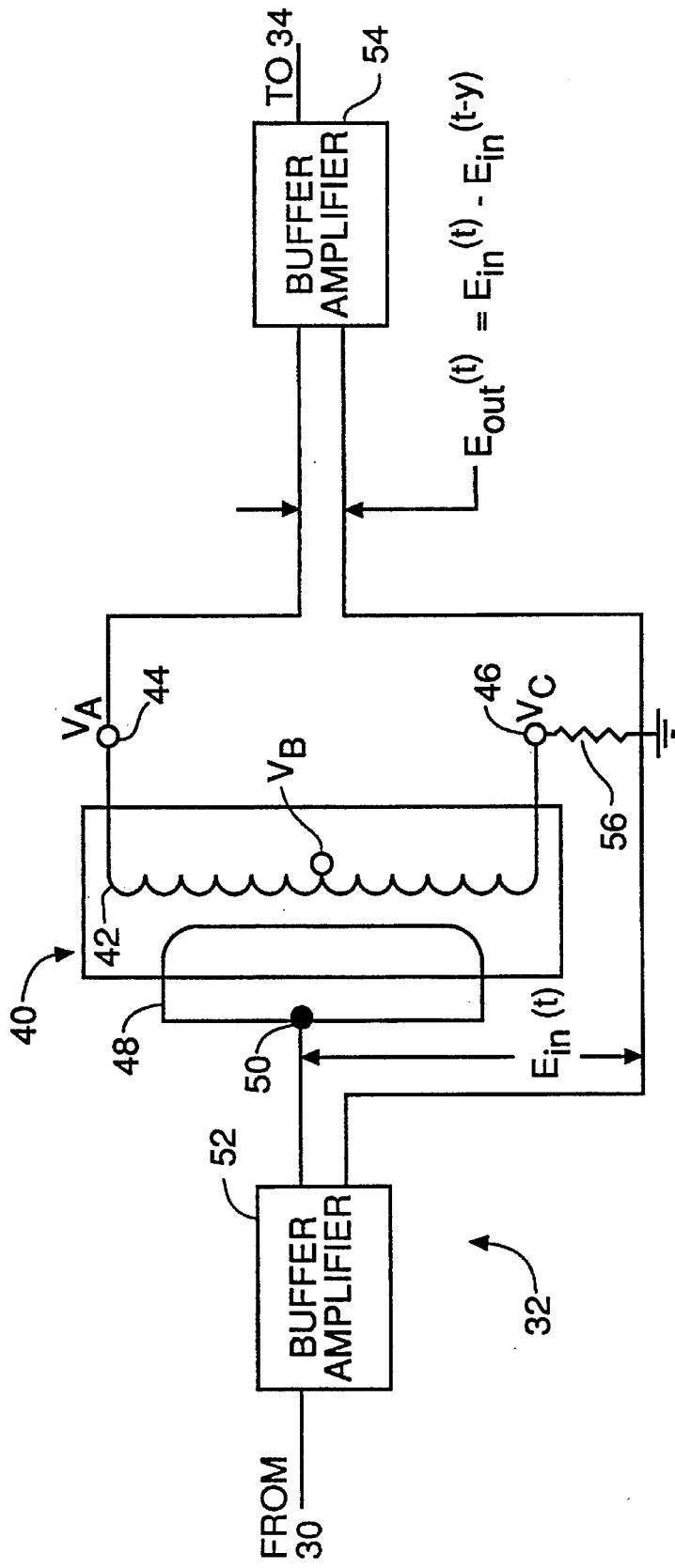
FIG. 6 is a schematic diagram of an embodiment of the correlator circuit of the present invention.

Referring now to FIG. 6, there is shown a preferred embodiment of correlator circuit according to the present invention. As shown, correlator circuit 32 includes a ground driven delay line 40 with an inductor 42 having first terminal 44 and second terminal 46. Delay line 40 also includes a shield 48 having a shield terminal 50 which is electrically connected to the output of the buffer amplifier 52 with respect to ground. Delay line 40 has a characteristic impedance $Z_0$ and a delay period of $\tau$. Terminal 46 of delay line 40 is connected to ground through impedance 56 having an impedance of $Z_0$, equal to the impedance of delay line 40. The correlator circuit output is taken from terminal 44 and applied to the output buffer amplifier 54.

The correlator circuit 32 of FIG. 6 operates as follows. Input buffer amplifier 52 buffers the image signal from solid state sensor 30 and applies it to the grounded shield terminal 50 as voltage $E_{in}(t)$. Delay line 40 acts to delay the signal by a delay interval $\tau$. The output image signal from delay line 40 $E_{out}(t)$ is $E_{in}(t)-E_{in}(t-\tau)$. The amplitude of the output signal is proportional to the picture information in the image signal. Moreover, since the low frequency noise which appears in the reset signal and the image signal is the same (correlates), it is subtracted in the output signal from grounded delay line 40. Buffer amplifier 54 buffers the output signal from delay line 40 and the buffered signal is applied to low pass filter 34.

Referring to FIG. 7, there are shown graphical illustrations of $E_{in}(t)$, $E_{in}(t-\tau)$, and $E_{out}(t)$. The bottom graphical illustration of FIG. 7 shows the sampling clock of digital-to-analog converter FIG. 8 is a graphical illustration of the operation of the circuit of FIG. 6 showing its response to a step function $E_{in}(t)$.

Because $E_{in}(t)$ has been at voltage $V_1$ for a long time and there is no DC path through the Delay line 40 from ground to output, the voltages at $V_A$, $V_B$, and $V_C$ (FIG. 6) are zero. When at t=0 $E_{in}(t)$ jumps from $V_1$ to $V_2$ the voltage at $V_C$ jumps to $(V_2-V_1)/2$ because the delay line 40 at $V_C$ and the resistor 56 form a 50% voltage divider. The voltage at $V_B$ and $V_A$ jumps to $(V_2-V_1)$ due to the capacitive coupling from the ground terminal of the delay line 40 and the high impedance of $V_B$ and $V_A$ to system ground. After $\tau/2$ the voltage step at $V_C$ has propagated to $V_B$ causing $V_B$ to drop to $(V_2-V_1)/2$. After $\tau$ the voltage step has propagated to $V_A$ (the end of the delay line) it sees the open circuit at $V_A$ and is reflected and inverted becoming $-(V_2-V_1)/2$. The change in voltage of the propagating step from $(V_2-V_1)/2$ to $-(V_2-V_1)/2$ is equal to $-(V_2-V_1)$ and just cancels the voltage at $V_A$ at time $\tau$. The inverted and reflected voltage step cancels the remaining voltage at $V_B$ when it arrives at time $3\tau/2$ and the voltage at $V_C$ when it arrives at time $2\tau$. The voltage at $E_{out}(t)$ is equal to $E_{in}(t)-E_{in}(t-\tau)$.

The invention has been described in detail with particular reference to a presently preferred embodiment, but it will be understood that variations and modifications can be effected within the spirit and scope of the invention.

What is claimed is:

1. A correlator circuit for removing noise from a signal, comprising:

a shielded delay line having a characteristic impedance $Z_O$ and a delay period $\tau$; said shielded delay line having an inductor with first and second terminals and a shield terminal which is connected to electrical ground;

an impedance connected between said second terminal and electrical ground, said impedance having an impedance value $Z_O$; and a signal source for providing to said shield terminal of said shielded delay line a signal having a sequence of a first interval with a first signal value and a second interval with a second signal value;

wherein the signal output from said first terminal of said delay line is free from noise and has a signal value which is a function of the difference between said first signal value and said second signal value.

2. The correlator circuit of claim 1 wherein the signal provided by said signal source is represented by $E_{in}(t)$ and the signal output from said delay line is represented by $E_{out}(t)=E_{in}(t)-E_{in}(t-\tau)$.

3. The correlator circuit of claim 1 including a low pass filter for removing high frequency noise from said output signal.

4. The correlator circuit of claim 1 including a digital-to-analog circuit for converting said output signal into a digital signal.

5. A correlator circuit for removing noise from an image signal, comprising:

a shielded delay line having a characteristic impedance $Z_O$ and a delay period $\tau$; said shielded delay line having an inductor with first and second terminals and a shield terminal which is connected to electrical ground;

an impedance connected between said second terminal and electrical ground, said impedance having an impedance value $Z_O$; and an image signal source for providing to said shield terminal of said shielded delay line an image signal having a sequence of a first interval with a reset signal value and a second interval with an image signal value;

wherein the image signal output from said first terminal of said delay line is free from noise and has a signal value which is a function of the difference between said reset signal value and said image signal value.

6. The correlator circuit of claim 5 wherein the image signal provided by said image signal source is represented by $E_{in}(t)$ and the image signal output from said delay line is represented by $E_{out}(t)=E_{in}(t)-E_{in}(t-\tau)$.

7. The correlator circuit of claim 5 including a low pass filter for removing high frequency noise from said output image signal.

8. The correlator circuit of claim 5 including a digital-to-analog circuit for converting said output image signal into a digital image signal.

\* \* \* \* \*